US006971472B2

(12) United States Patent
Pedersen et al.

(10) Patent No.: US 6,971,472 B2
(45) Date of Patent: Dec. 6, 2005

(54) FULLY HYDRAULIC STEERING

(75) Inventors: Ove Pedersen, Aabenraa (DK); Bjarne Schmidt, Augustenborg (DK)

(73) Assignee: Sauer-Danfoss ApS, Nordborg (DK)

( * ) Notice: Subject to any disclaimer, the term of this patent is extended or adjusted under 35 U.S.C. 154(b) by 0 days.

(21) Appl. No.: 10/727,905

(22) Filed: Dec. 4, 2003

(65) Prior Publication Data

US 2004/0182636 A1 Sep. 23, 2004

(30) Foreign Application Priority Data

Dec. 5, 2002 (DE) ................................ 102 57 130

(51) Int. Cl.[7] ................................................ B62D 5/06
(52) U.S. Cl. ...................................... 180/403; 180/417
(58) Field of Search ............................... 180/403, 405, 180/406

(56) References Cited

U.S. PATENT DOCUMENTS 4,703,819 A 11/1987 Hosotani
5,215,158 A * 6/1993 Pedersen .................... 180/403
5,263,321 A * 11/1993 Thomsen et al. ............. 60/384
5,520,262 A 5/1996 Marcott
6,336,519 B1 * 1/2002 Bohner et al. .............. 180/403
6,367,575 B1 * 4/2002 Bohner et al. .............. 180/403
6,502,661 B1 * 1/2003 Heitzer ....................... 180/403
6,612,393 B2 * 9/2003 Bohner et al. .............. 180/405

FOREIGN PATENT DOCUMENTS

DE 19844331 A1 4/2000
JP 63188569 8/1988

* cited by examiner

*Primary Examiner*—Kevin Hurley
(74) *Attorney, Agent, or Firm*—McCormick, Paulding & Huber LLP

(57) ABSTRACT

The invention concerns a fully hydraulic steering with a steering member, a steering unit that can be activated by the steering member, said steering unit comprising a supply connection arrangement (P, T) with a pressure connection (P) and a tank connection (T), and a working connection arrangement (L, R) with two working connections (L, R), and a steering motor, which is connected with the working connection arrangement (L, R). It is endeavored to increase the possibilities of steering. For this purpose, it is ensured that an auxiliary force operated steering valve is arranged in parallel to the steering unit between the supply connection arrangement (P, T) and the working connection arrangement (L, R).

9 Claims, 1 Drawing Sheet

FULLY HYDRAULIC STEERING

CROSS-REFERENCE TO RELATED APPLICATIONS

This application is entitled to the benefit of and incorporates by reference essential subject matter disclosed in German Patent Application No. 102 57 130.9 filed on Dec. 5, 2002.

1. Field of the Invention

The invention concerns a fully hydraulic steering with a steering member, a steering unit that can be activated by the steering member, said steering unit comprising a supply connection arrangement with a pressure connection and a tank connection, and a working connection arrangement with two working connections, and a steering motor, which is connected with the working connection arrangement.

2. Background of the Invention

In a fully hydraulic steering, a direct mechanical active connection does not exist between the steering member, for example a steering handwheel or a joystick, and the steered element, for example the steered wheels of a vehicle or the rudder of a ship. On the contrary, the steered element is controlled by a steering motor, which again is supplied via the steering unit. Usually, such a steering unit consists of a measuring motor section and a directional section, the latter usually having two mutually rotatable slides. The steering member rotates one slide, thus releasing a flow path from the pressure connection to one of the working connections, while another flow path is realised from the second working connection to the tank connection. The fluid flowing to the steering motor is led via the measuring motor, which again makes the other slide follow, so that when the desired fluid amount has flown through, the flow paths are closed again. In case of failure of the pump supplying the pressure connection, the measuring motor of the steering unit acts as emergency pump, that is, by activating the steering handwheel, the driver can pump the fluid to the steering motor, which is required to cause a change of direction.

When a steering unit is provided with a measuring motor, which also has to act as emergency steering pump, the measuring motor must not be too large. Otherwise, during emergency steering, the driver would have to provide substantial force to cause a position change of the steered element, for example to cause a change of direction. On the other hand, the measuring motor must not be too small. Otherwise, each steering activity would require a substantial movement of the steering element.

SUMMARY OF THE INVENTION

The invention is based on the task of increasing the opportunities during steering. With a fully hydraulic steering of the kind, this task is solved in that an auxiliary force operated steering valve is arranged in parallel to the steering unit between the supply connection arrangement and the working connection arrangement.

With a steering valve of this kind, it is possible to supply the steering motor with hydraulic fluid not only via the steering unit, but also via a parallel path. This can be utilised for a plurality of possibilities. For example, it is possible to use a measuring motor with a smaller tooth set, that is, a smaller displacement, in the steering unit. During emergency steering the vehicle can thus be steered with a relatively small force. During trouble-free operation, a further share of fluid can be supplied through the steering valve in addition to the fluid supplied through the steering unit with the smaller measuring motor section. The steering valve no longer has to be activated mechanically via the steering member. An auxiliary force can be used for adjusting the steering valve, for example a hydraulic pressure or an electrical power.

Preferably, the steering member acts upon a sensor, whose outlet is connected with a steering valve control device. This is a relatively simple possibility of controlling the steering valve. A sensor, which is arranged on the steering member, for example a steering handwheel or a joystick, determines the position of the steering member and then adjusts the steering valve so that the desired fluid amount can flow from the supply connection arrangement to the working connection arrangement without acting upon the steering unit to a corresponding extent. The steering member can also act upon the sensor indirectly, for example in that the sensor measures pressures or flows or something else, which are caused by the steering member.

Preferably, the sensor produces a proportional steering signal. A proportional signal, that is, a signal, whose dependence on the position of the steering member follows a linear function, is easy to process. No conversions have to be made, which depend on the position of the steering member.

Preferably, a share of the fluid supplied to the steering motor, originating from the steering valve, can be changed. This change can either be made from vehicle to vehicle or from series to series. In the same manner, it is possible to use the same steering for a plurality of vehicles, without the need for major design changes. However, it is also possible to change the share in dependence of the operation state or the work task of a vehicle, that is, when the steering has already been built into a vehicle. The driver can make the change, for example by means of a select switch or the like. It can also occur in dependence of the load state or another value to be measured by a sensor. Finally, during operation, it is also possible to change the share, that is, the relation between the fluid supplied via the steering unit and the fluid supplied via the steering valve. This can, for example, be done when going from street operation to building-site operation or the like.

Preferably, the steering valve is put together with the steering unit. This keeps lines short, which are required for connecting the supply connection arrangement and the working connection arrangement with the steering valve. In principle, the steering unit with the steering valve can be handled in exactly the same way as the steering unit alone.

In a preferred embodiment, it is ensured that the steering valve is flanged onto the steering unit. In another embodiment it may be ensured that the steering valve is built into the steering unit. In both cases, the steering valve and the steering unit are combined to a compact component.

Preferably, at least parts of a control electronics are arranged on the outside of the steering unit. This involves the advantage that the control electronics can be cooled by the surroundings, that is, the thermal load of the control electronics can be kept small.

It is also advantageous that a steering motor sensor is arranged on the steering motor, a leakage compensation device being provided, which contains the steering valve. A steering motor sensor monitors the position of the steering motor. This is particularly advantageous, when the steering valve must also be activated independently of the steering member, that is, via a remote control or a GPS (Global Positioning System). Particularly advantageous, however, is the fact that the steering valve can also be used to compensate for possibly occurring leakages in the steering. As soon as fluid has been lost, the accordance between the positions of steering member and steering motor is lost. This accordance can be restored by a supply of fluid, which can in a simple manner be controlled via the steering valve.

BRIEF DESCRIPTION OF THE DRAWINGS

In the following, the invention is explained in detail on the basis of a preferred embodiment in connection with the drawings, showing.

DETAILED DESCRIPTION OF THE PREFERRED EMBODIMENTS

Figure 1:
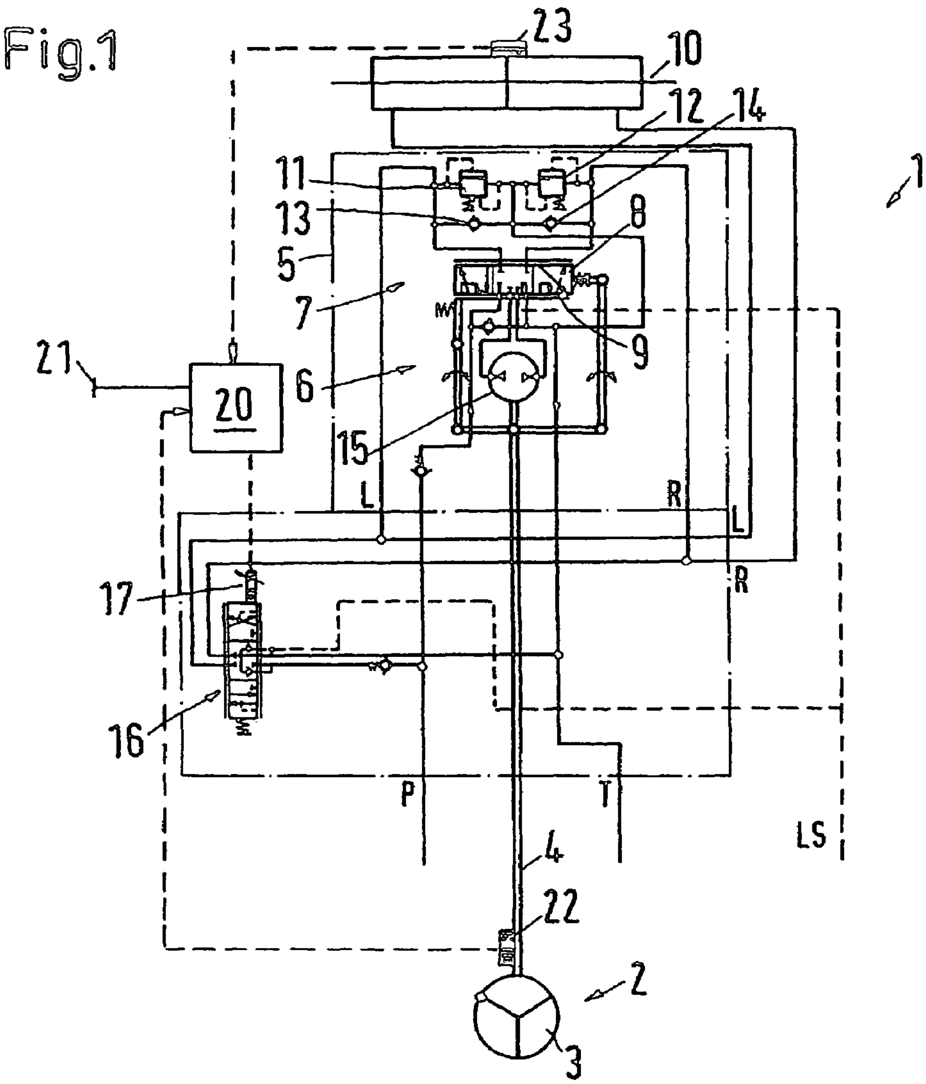
FIG. 1 is a schematic view of a hydraulic circuit of a fully hydraulic steering

FIG. 1 is a schematic view of a fully hydraulic steering 1 with a steering member 2, in the present case in the form of a steering handwheel 3. Via a steering column 4, the steering handwheel 3 is connected with a steering unit 5. The steering motor 5 has a measuring motor section 6 with a measuring motor 15 and a directional section 7. The mode of operation of such a steering unit is known per se. When the steering handwheel 3 is turned, one slide 8 is turned via the steering column in relation to another slide 9, thus releasing a flow path from a pressure connection P to a working connection L, R. At the same time, a further flow path is established from the other working connection R, L to a tank connection. The measuring motor 15 in the measuring motor section 6 is activated by the fluid, which flows from the supply connection arrangement with the pressure connection P and the tank connection T to the working connection arrangement with the two working connections L, R, and turns the two slides 8, 9 back to their neutral position, in which the flow paths are interrupted. The amount of hydraulic fluid flowing via the working connection arrangement L, R, reaches a steering motor 10 and activates it in the desired manner, that is, the deflection of the steering motor 10 is usually proportional to the rotary movement of the steering handwheel 3. Here, the steering motor exists in the form of a steering cylinder.

Between the working connections L, R and the directional section 7, pressure-reducing valves 11, 12, also called "shock valves", and non-return valves 13, 14 for anti-cavitation, can be arranged in a manner known per se.

Such a steering has proved its value for a long time. As a fully hydraulic steering is concerned, there is no direct mechanical connection between the steering member 2 and the steering motor 10. The activation of the steering motor 10 occurs exclusively via hydraulic fluid, whose supply is controlled by the steering unit 5.

When the pressure at the pressure connection P drops, for example when a drive motor of the vehicle provided with the steering 1 fails, said motor also driving a pump, which supplies the pressure, the vehicle can be steered anyway, as in this case, the measuring motor 15 of the measuring motor section 6 serves as emergency steering pump, that is, it is activated directly by the steering handwheel 3 and can transport the required fluid to the steering motor 10.

When dimensioning the measuring motor 15, however, certain compromises must be accepted. Firstly, the measuring motor 15 must not be too small, that is, the displacement should not fall short of a predetermined minimum size, as then a very large number of rotations would be required to cause a certain deflection of the steering motor 10. When, on the other hand, the measuring motor 15 is too large, the driver will require a substantial body power to pump the required amount of fluid to the steering motor 10 during a failure of the pump, which supplies the pressure at the pressure connection P.

In the steering 1 is provided a steering valve 16, which is connected in parallel with the steering unit 5 between the supply connection arrangement with the pressure connection P and the tank connection T, and the working connection arrangement with the working connections L, R. The steering valve 16 is auxiliary power operated. In the present case, it has a magnetic drive 17. Other drives, for example hydraulic drives, can of course also be imagined.

Figure 2:
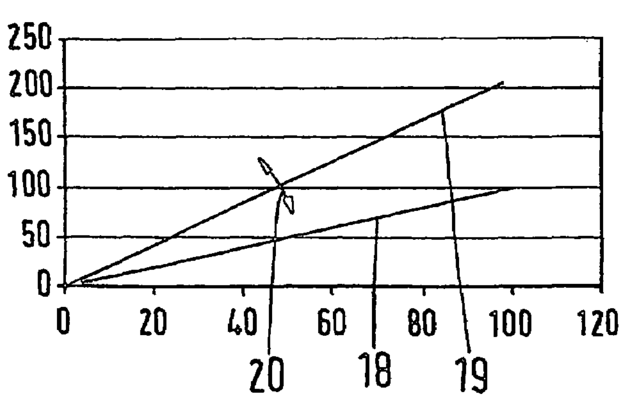
FIG. 2 is a schematic view of the relation between the fluids supplied by the steering motor

By means of the steering valve 16, fluid can be supplied from the supply connection arrangement P, T to the working connection arrangement L, R, thus driving the steering motor 10, without requiring that the total amount of fluid must flow through the steering unit 5, thus acting upon the measuring motor 15. This is shown schematically in FIG. 2. The horizontal direction shows the rotational speed of the steering handwheel 3, and the vertical direction shows the corresponding amount of fluid transported. A curve 18 shows the amount of fluid, which is supplied by the steering unit 5 alone. A curve 19 shows the amount, which is supplied to the steering motor by the steering unit 5 and the steering valve 16 in common. An arrow 20 shows that the amount of fluid, which is controlled by the steering valve 16 and the steering unit 5 in common, can be changed. As the amount of fluid, which can be controlled by the steering unit 5, is constant, this means that the share of the fluid, which is controlled by the steering valve 16, can be changed.

The change of this share can be used to adapt the steered vehicle to different operating conditions. The change can also occur on the vehicle, for example by the driver, who activates an adjustment device 21 connected with a control device 20. The share, which is controlled by the steering valve 16, can also be fixed, though being different from steering to steering. Thus, an adaptation to different vehicle types or series is possible.

The control of the steering valve 16 occurs via the control device 20 mentioned above. The control device 20 is connected with a sensor 22, which generates a proportional signal in dependence of the position of the steering handwheel 3. The sensor 22 can also be called steering member sensor.

Further, the control device 20 is connected with a steering motor sensor 23. For example, the control device compares, if the positions, which are determined by the steering member sensor 22 and the steering motor sensor 23, correspond to each other. If this is not the case, the steering valve 16 is opened, supplying oil to the steering motor 10, until the correspondence has been achieved. Of course, this compensation of missing correspondence cannot only be made during idling, but also during steering.

Thus, the steering valve 16 definitely able to control the steering motor 10 proportionally to the steering unit 5.

In many cases, it is not necessary at all for the steering unit 5 to be activated. This applies, for example, when the vehicle provided with the steering 1 is remote-controlled. Thus, the steering can also be used for a GPS steering and other kinds of electrical steerings.

Figure 3:
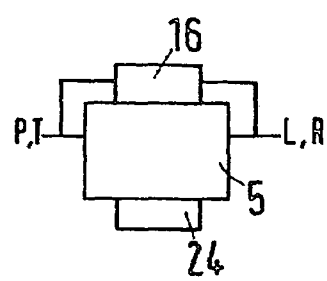
FIG. 3 is a schematic external view of a steering unit

FIG. 3 is a schematic external view of the steering unit 5. The steering valve 16 is flanged onto the steering unit 5. An alternative embodiment provides that the steering valve 16 is built into the steering unit 5. At least parts of a control electrode 24, by means of which the control device 20 is realised, are arranged on the outside of the steering unit 5.

The environment then cools the control electronics 24, so that thermal overloading of the control electronics 24 can be avoided. Shown are merely the supply connection arrangement P, T and the working connection arrangement L, R, each with one line. It is obvious that, in relation to the drawing level, an additional line of these connection arrangements is arranged behind the line shown.

The steering valve 16 does not only control the amount of hydraulic fluid from the supply connection arrangement P, T to the steering motor 10, but also its direction.

What is claimed is:

1. A fully hydraulic steering with a steering member, a steering unit that can be activated by the steering member, said steering unit comprising a supply connection arrangement with a pressure connection and a tank connection, and a working connection arrangement with two working connections, and a steering motor, which is connected with the working connection arrangement, wherein an auxiliary force operated steering valve is arranged in parallel to the steering unit between the supply connection arrangement (P, T) and the working connection arrangement (L, R), said auxiliary force operated steering valve being configured to supply said steering motor with hydraulic fluid.

2. A steering according to claim 1, wherein the steering member acts upon a sensor, whose outlet is connected with a steering valve control device.

3. A steering according to claim 2, wherein the sensor produces a proportional steering signal.

4. A steering according to claim 1, wherein a share of the fluid supplied to the steering motor, originating from the steering valve, can be changed.

5. A steering according to claim 1, wherein the steering valve is put together with the steering unit.

6. A steering according to claim 5, wherein the steering valve is flanged onto the steering unit.

7. A steering according to claim 5, wherein the steering valve is built into the steering unit.

8. A steering according to claim 1, wherein at least parts of a control electronics are arranged on the outside of the steering unit.

9. A steering according to claim 1, wherein a steering motor sensor is arranged on the steering motor, a leakage compensation device being provided, which contains the steering valve.

* * * * *